A. F. CHRIST.
FENCE WIRE REELING APPARATUS.
APPLICATION FILED AUG. 21, 1908.
946,012.
Patented Jan. 11, 1910.
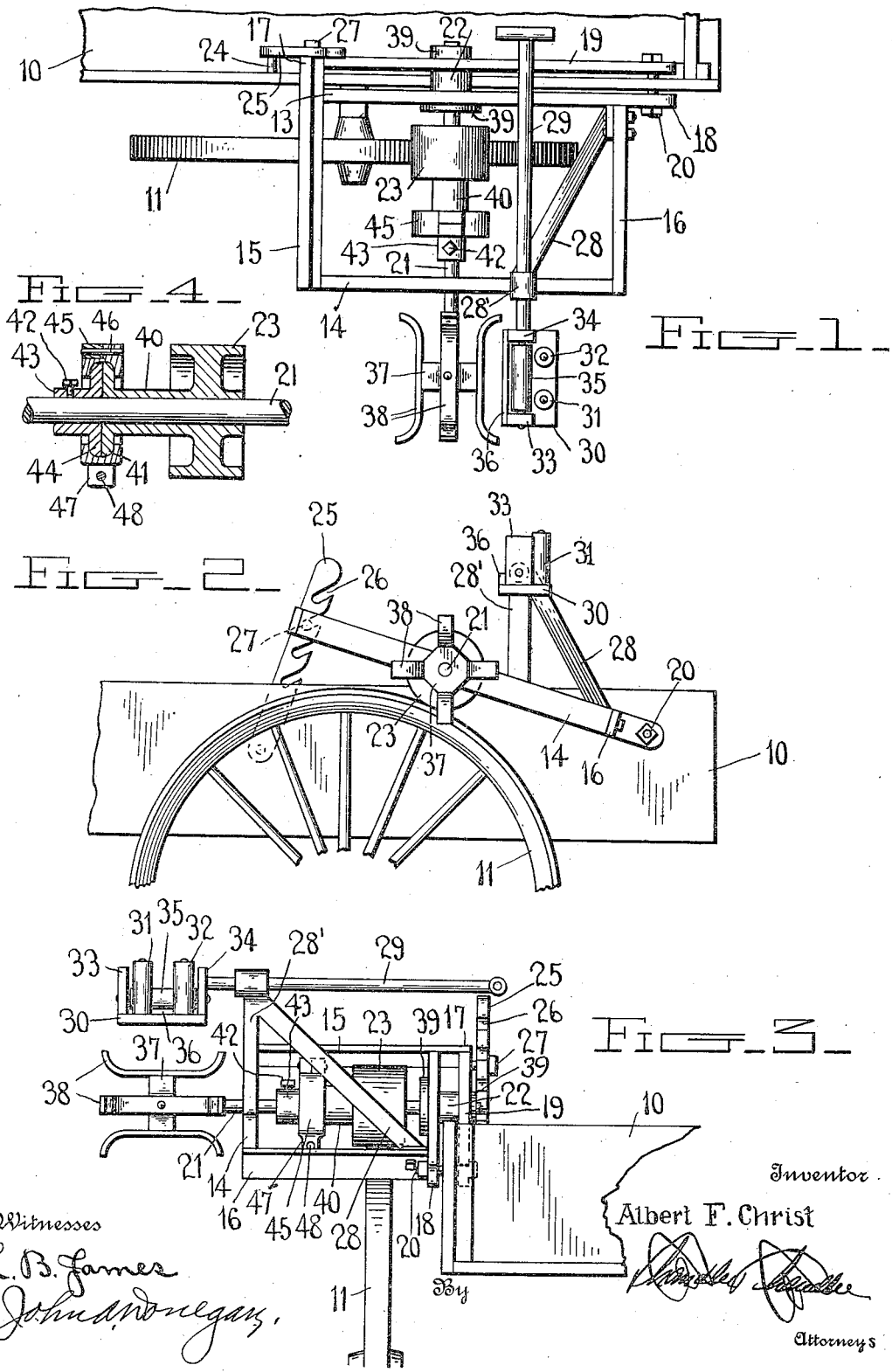
Witnesses
L. B. James
John Donegan
Inventor
Albert F. Christ
By
Attorneys

UNITED STATES PATENT OFFICE.

ALBERT F. CHRIST, OF MASCOUTAH, ILLINOIS.

FENCE-WIRE-REELING APPARATUS.

946,012.  Specification of Letters Patent.  Patented Jan. 11, 1910.

Application filed August 21, 1908. Serial No. 449,671.

*To all whom it may concern:*

Be it known that I, ALBERT F. CHRIST, a citizen of the United States, residing at Mascoutah, in the county of St. Clair, State of Illinois, have invented certain new and useful Improvements in Fence-Wire-Reeling Apparatus; and I do hereby declare the following to be a full, clear, and exact description of the invention, such as will enable others skilled in the art to which it appertains to make and use the same.

This invention relates to devices for reeling wire, more particularly to reeling fence wire in erecting and taking up fences, and has for one of its objects to simplify and improve the construction and increase the efficiency and utility of devices of this character.

Another object of the invention is to provide a simply constructed device of this character which may be readily attached to an ordinary farm wagon body and rendered operative through the rotary motion of one of the wheels of the wagon.

With these and other objects in view the invention consists in a rectangular frame adapted to be pivotally connected to the wagon body and provided with a transverse shaft carrying a pulley adapted to bear upon one of the rear wheels of the wagon and to be rotated thereby, means for adjusting the frame to move the pulley into or out of contact with the wheel, a plurality of winding reels adapted to be detachably coupled one at a time to the shaft, and means for guiding the wire to the reel.

The invention further consists in certain novel features of construction as hereafter shown and described and then specifically pointed out in the claims, and in the drawings illustrating the preferred embodiment of the invention, Figure 1 is a plan view of a portion of a wagon body and one of the wheels with my improved device applied. Fig. 2 is a fragmentary side elevation of a wagon body and also one of the rear wheels and showing my device in side elevation. Fig. 3 is a fragmentary rear end elevation of a wagon body and one of the rear wheels and showing my improved device in rear end elevation. Fig. 4 is an enlarged sectional detail showing the coupling between the drive pulley and reel shaft.

The improved device may be applied to any of the various forms and sizes of farm wagon bodies or boxes and for the purpose of illustration is shown applied to a conventional structure of this character in which 10 designates the wagon body or box and 11 one of the rear wheels.

The improved device comprises a frame formed with spaced sides 13—14 and transverse end members 15—16, the end members 15 projecting beyond the side member 13 at 17, and the member 13 extending beyond the end member 16 as at 18. Extending longitudinally of the frame and spaced from the member 13 is a supplemental member 19 equal in length to the member 13 and connected at one end to the extended portion 17 of the member 15. The spaced members 13—19 are disposed upon opposite sides of one of the side members of the body 10 and bolted thereto at 20, whereby the rectangular frame is swingingly coupled to the body 10.

Mounted for rotation through the members 14—13—19 is a shaft 21 having a spacer member 22 between the members 13—19 to hold the same apart. The shaft 21 is provided with a pulley 23 adapted to bear upon the adjacent rear wheel of the vehicle, in the illustration the wheel 11 being employed for this purpose, so that the rotary motion of the wheel will be imparted to the shaft through its engagement with the pulley. The shaft 21 is provided with stop collars 39 to prevent it from moving longitudinally of the frame.

Swinging from the side member 10 of the wagon body at 24 is a bar 25 having spaced notches 26 adapted to engage one at a time over a bolt 27 projecting from the member 19, the bar operating to support the rectangular frame in position with its pulley bearing upon the wheel 11, while at the same time operating when adjusted by its notches 26 upon the bolt 27 to hold the frame upwardly with its pulley free from the wheel when not in use.

Extending upwardly over the rectangular frame is an angular bracket consisting of an upright 28', the lower end of which upright is fixedly secured at a point adjacent the rear end of the outer side 14 of the frame; the upper end of the upright 28' is provided with a boxing in which is journaled a rod 29. The rod 29 is slidably disposed in the boxing and at its outer end carries a swinging wire guiding device. This wire guiding device comprises a base 30, carrying two vertical guide rollers 31 and 32, and also two vertical standards 33 and 34, through which a horizontal roller 35 is rotatably mounted. The rod 29 extends through the standard 34 and upon which the latter is mounted to swing. By this means the wire guiding device, it will be obvious, is free to swing as a whole upon the rod 29. The standards 33 and 34 are supported by a transverse brace member 36. The upright 28' is held braced by means of a strut 28, having its upper end secured adjacent the upper end of the upright and its lower end to the inner end of the inner side 13 of the frame.

Detachably mounted upon the shaft 21 outside of the rectangular frame is the head 37 of a wire winding reel, to which the reel arms 38 are secured in any preferred manner. The head 37 will be coupled to the shaft 21 so as to partake of its rotary motion, while at the same time being readily detachable therefrom when required.

By this simple means when a strand of wire is to be reeled or when fencing material is to be taken up or removed from one part of the field to another, one end of the wire is connected to the reel and the rectangular frame disposed so that the pulley 23 bears upon the wheel 11 and the wagon moved on the ground along the side of the fence, and the wire reeled as the wagon proceeds, and when one reel is filled the wire is severed and an empty reel fixed upon the shaft and the operation proceeded with. The reeling can thus be accomplished very rapidly and completely and the wire disposed in convenient condition for future use or for rebuilding fences. As the winding proceeds the rod 29 is manipulated manually to move the wire back and forth longitudinally of the shaft 21 and thus dispose the wire symmetrically or uniformly upon the reel, as the guide rollers 31—32 and 35 guide the material to the reel, and prevent it from running off from the side, or winding unevenly on the reel. The angular bracket and the wire guiding devices are located at a sufficient height above the reel so that the wire passes over the guide roller 35 and is then deflected downwardly, whereby the requisite tension is secured to cause the wire to run upon the wheel uniformly and symmetrically. The angular bracket is detachably secured to the supporting frame of the reel in order that it may be secured to either side of the frame, and as the last mentioned frame may be positioned on either side of the wagon, the machine is reversible and may be attached to either side of the wagon body.

In order that the wire may be unwound from the reel without disengaging the pulley 23 from the wagon wheels 11 or 12, the following described coupling is provided: The pulley 23 is loose on the shaft 21 and is formed on one side with a sleeved extension 40 encircling the shaft, and at the end of said extension is a disk 41 having a quadrantal periphery. Fixed to the shaft 21, by means of a set screw 42, is a sleeve 43 formed on one end with a disk 44 which also has a quadrantal periphery. When the pulley 23, sleeve 43, and their associated parts are in position on the shaft, the disks 41 and 44 are engaged with each other face to face, and form a two-part collar having a semicircular periphery. Around the collar thus formed is placed a clamp consisting of two members 45 pivotally connected at one end as indicated at 46, and having at their other ends ears 47 through which is threaded a screw 48. The inner surface of the clamping members is shaped to conform to the periphery of the disk and fits snugly thereon. The disks will be coupled together by the clamping members 45, and as the disk 44 is made fast to the shaft 21 it will be seen that said shaft will turn with the pulley 23 when the latter is in frictional contact with the wagon wheels. Upon loosening the clamping members by means of the screw 48 the disks will be disengaged from each other and the pulley is then free to turn on the shaft 21 without transmitting its motion thereto.

What is claimed, is:—

1. In a wire reeling apparatus the combination with a shaft; of a sleeve loosely fitted on said shaft and provided at one end with a pulley and terminating at its opposite end in a friction disk, a second sleeve secured to said shaft and terminating at one end in a friction disk to engage with the first-named friction disk, a collar consisting of pivoted sections bearing on both of said friction disks, and means for detachably securing the free ends of said sections to hold the bearing surfaces of said disks in close engagement.

2. In a wire reeling apparatus the combination with a shaft; of a sleeve loosely fitted on said shaft and provided at one end with a pulley and terminating at its opposite end in a friction disk, a second sleeve secured to said shaft and terminating at one end in a friction disk to engage with the first-named friction disk, a collar consisting of pivoted sections provided on their inner surfaces with grooves to receive the peripheries of both of said friction disks, and means for detachably securing the free ends of said collar sections to hold the bearing surfaces of said disk in close engagement.

In testimony whereof, I affix my signature, in presence of two witnesses.

ALBERT F. CHRIST.

Witnesses:
GUST BINZ,
FRED. SCHNEBELIN.